(12) United States Patent
Wieweg et al.

(10) Patent No.: US 10,489,433 B2
(45) Date of Patent: Nov. 26, 2019

(54) NATURAL LANGUAGE DATA ANALYTICS PLATFORM

(71) Applicant: Artificial Solutions Iberia SL, Barcelona (ES)

(72) Inventors: Andreas Wieweg, Stockholm (SE); David Hjelm, Bagarmossen (SE); Sonja Petrovic Lundberg, Saltsjöbaden (SE); Eric Aili, Bandhagen (SE)

(73) Assignee: Artificial Solutions Iberia SL, Barcelona (ES)

( * ) Notice: Subject to any disclaimer, the term of this patent is extended or adjusted under 35 U.S.C. 154(b) by 658 days.

(21) Appl. No.: 14/711,742

(22) Filed: May 13, 2015

(65) Prior Publication Data

US 2015/0339376 A1 Nov. 26, 2015

Related U.S. Application Data

(63) Continuation-in-part of application No. 13/565,790, filed on Aug. 2, 2012, now Pat. No. 8,346,563.

(60) Provisional application No. 61/992,728, filed on May 13, 2014.

(51) Int. Cl.
| | |
|---|---|
| *G06F 16/332* | (2019.01) |
| *G06F 16/33* | (2019.01) |
| *G06N 20/00* | (2019.01) |
| *G06F 16/51* | (2019.01) |
| *G06F 17/27* | (2006.01) |

(52) U.S. Cl.
CPC ...... *G06F 16/3329* (2019.01); *G06F 16/3344* (2019.01); *G06F 16/51* (2019.01); *G06F 17/27* (2013.01); *G06N 20/00* (2019.01)

(58) Field of Classification Search
CPC .............. G06F 17/30654; G06F 17/27; G06F 17/3028; G06F 9/445; G06F 8/41; G06F 16/3329; G06F 16/51; G06F 16/338; G06F 17/28; G06F 17/287; G06F 16/2228; G06F 9/485; G06N 99/005; G06N 20/00; G06N 5/04; G06N 99/0005; G10L 15/1822; G10L 15/1815; G06Q 30/02; G06Q 30/0206; G06Q 30/0201; G06Q 50/01
USPC ....................................... 707/739
See application file for complete search history.

(56) References Cited

U.S. PATENT DOCUMENTS

| | | | |
|---|---|---|---|
| 2003/0061200 A1* | 3/2003 | Hubert | G06F 17/30011 |
| 2010/0114562 A1* | 5/2010 | Hutchinson | G06F 17/2229 704/9 |
| 2011/0125734 A1* | 5/2011 | Duboue | G09B 7/00 707/723 |

OTHER PUBLICATIONS

Library (computing), Feb. 12, 2019, Wikipedia, p. 1, <https://en.wikipedia.org/wiki?Library_(computing)> (Year: 2019).*

(Continued)

*Primary Examiner* — James Trujillo
*Assistant Examiner* — Michal Lawrence Bogacki
(74) *Attorney, Agent, or Firm* — Brian R. Galvin; Galvin Patent Law LLC

(57) ABSTRACT

A system for natural language analytics, stored and operating on a network-connected computing device, comprising a natural language application data importer, further comprising a natural language application data importer, a natural language application data augmenter that enriches the data and an analytics component which provides a means of querying structured as well as unstructured data and which also contains a method for providing adaptive natural language analytics.

11 Claims, 9 Drawing Sheets

(56) References Cited

OTHER PUBLICATIONS

Natural Language Toolkit, Jan. 6, 2019, Wikipedia, p. 1, <https://en.wikipedia.org/wiki/Natural_Language_Toolkit> (Year: 2019).*

* cited by examiner

NATURAL LANGUAGE DATA ANALYTICS PLATFORM

CROSS-REFERENCE TO RELATED APPLICATIONS

This application claims the benefit of, and priority to, U.S. provisional patent application Ser. No. 61/992,728 titled "NATURAL LANGUAGE DATA ANALYTICS PLATFORM" and filed on May 13, 2014, and is a continuation-in-part of U.S. patent application Ser. No. 13/565,790 titled "SYSTEM AND METHODS FOR DELIVERING ADVANCED NATURAL LANGUAGE INTERACTION APPLICATIONS" and filed on Aug. 2, 2012, now issued as U.S. Pat. No. 8,346,563, on Jan. 1, 2013, the entire specifications of each of which are incorporated herein by reference in their entirety.

BACKGROUND OF THE INVENTION

Field of the Art

The disclosure relates to the field of data analysis, and more particularly to the field of natural language-based analysis.

Discussion of the State of the Art

In the field of data analytics, "big data" analysis is used in various industries as a means of identifying and understanding customer likes or dislikes, sentiment (such as their attitudes or intentions regarding a vendor or product), trends, problems, opportunities, and a variety of such customer data-centric information. However, there exists a shortcoming in that such data analysis generally relies on metric-based information, and lacks the ability to consider more abstract notions such as a customer's intent or opinion, such as might be implied during natural conversation (for example, while a customer is discussing an issue with a customer service representative). Expanding data analytics to address such natural language interaction (NLI) data is key to understanding implicit intent and understanding, contextual information such as might not be apparent through a purely metric-based analytics approach, as well as serving as a gateway to personalization of analytics operations (such as using NLI-based analysis to form an abstract concept of a customer's personality, and using this information to target future products, services, or offers).

What is needed, is a platform for providing NLI-based analytics and making such analysis available to third-party services, and that provides automated NLI-derived insight to enhance analysis operation and results.

SUMMARY OF THE INVENTION

Accordingly, the inventor has conceived and reduced to practice, in a preferred embodiment of the invention, a natural language data analytics platform, that provides a software application programming interface (API) for integration or interaction with external products or services (such as NLI applications that may provide data for analysis, or request analysis results), and that utilizes machine learning to provide insight and form implicit personalization operations.

NLI analytics may be utilized for more than simple reporting (as is common according to current practices). According to the embodiments described herein, NLI analytics may be utilized for optimization processes to bring data-driven development to NLI applications such as a virtual assistant (VA), for example by making the VA better at specific tasks for which it is intended, improving its natural language understanding, extending its functionality to new tasks or roles, or identifying what dialog flows do or do not work well or what knowledge areas need expansion or implementation. Analytics may also be used to measure NLI performance or effects, such as comparing whether a VA is meeting specific metrics or key performance indicators (KPIs), or usage data points or trends, for example what dialogs are frequently used or what tasks are commonly performed and by which users. These analytics may then be used to form additional insights for businesses and consumers, for example identifying key information about a user or company regardless of a VA's performance in particular, or identifying user information such as a user's identity, needs, or interests.

These new NLI analytics scenarios present additional novel challenges to be overcome that may be addressed according to the embodiment described herein. For example, it may not be possible to know precisely what data to anticipate in advance, such as due to variances in VA technologies or available data models. Similarly, it may not be possible to know in advance key areas of interest (such as KPIs or specific metrics that may be relevant, which must be detected after trends can be identified or specific values of note are reported). What is needed, is a means to present a comprehensive summary of data as it may not be possible for a human user to manually read and understand thousands of individual log files and a generalized summary may present identified key information without the "filler", and to support interactive or real-time data mining and enable a user to explore data according to their own criteria or custom, arbitrarily complex queries.

According to a preferred embodiment of the invention, a system for natural language data analytics comprising a natural language interaction query language (NLIQL), an analytics API, a log importer, and an analytics manager, is disclosed. According to the embodiment, an NLIQL may be used by the analytics API to process NLI data (for example, from NLI application logs imported by the log importer) and store this data as sequences of events. Each session may be represented as a flat sequence of events, where the basic definition of each event is as follows: request events comprising inputs sent to the system; response events comprising responses coming from the system; and path events comprising what happens in between.

Each session may be modeled as an ordered sequence of events, and may be represented in the order in which they occur in the NLI application. All events may belong to a "transaction", and each transaction may begin with a request event, continue with a list of path events and finally end with a response event. Individual events may have properties, that may be stored and made searchable within the NLIQL, and that may differ according to the type and content of a particular event (for example, two request events may have different properties, or all request events may have different properties form all response events, for example).

Further according to the embodiment, a log importer may receive (such as from currently running applications) or import (such as from a database or other storage) log files comprising NLI data received from a variety of sources such as external NLI applications, and may then make these logs available to the analytics API for processing and storage using an NLIQL as described above. The logfiles may contain such information as data regarding content of conversations (what people say) and system actions based on those conversations, as well as detailed information on what the system is doing internally to analyze or process those conversations (for example, event logs from the NLI applications detailing their internal activity in addition to the actual user conversations and input).

Further according to the embodiment, an analytics manager may submit queries to the analytics API (such as from a human user or from software applications or services interacting with the API), such as to query for dialogues (conversations or other NLI interactions that may have been logged), specific events or sequences of events (such as taking into account the ordering of events), or more natural "semantic search" queries such as querying using natural language rather than strict command syntax as is common in the art. For example, an NLIQL may be configured with specific "language conditions" that may be used to enable natural language queries based on linguistic recognition rather than strict command matching, facilitating a more natural query interface.

To improve integration and interaction with external applications and maximize the utility of the NLI analytics API and the NLIQL, the API may utilize RESTful APIs common in the art, as well as providing scripting functionality and additional extendable options common in software applications, such as to facilitate interaction with a broad variety of services and applications, without necessarily requiring additional work to be done to enable integration on the client's end. In this manner, the system of the invention may be useful in a variety of arrangement with various services and products, and may be adapted to integrate with a variety of additional or alternate services or products according to the invention, such as via REST APIs, JSON, scripting, $3^{rd}$ party queries or applications, or any other software-based integration or interaction means according to the intended use case.

According to another preferred embodiment of the invention, a method for providing machine learning and implicit personalization, is disclosed. According to the embodiment, an NLI analytics API may be integrated into the creation of NLI applications, such that NLI analysis functions are built in. When the application is run, operation may then be analyzed, and based on the results of that analysis improvement can be made (such as, for example, adjusting the path events an application takes in response to user input, as described above). Operation may continue in a cyclic fashion, with each successive operation being analyzed and improvements continuously being made based upon the analyses performed. For example, automated learning may identify an NLI application (such as dialog trees or responses) that may never be reached during actual usage. Such a scenario might occur, for example, as dialog trees are modified during manual upgrades or reorganization of a virtual assistant (VA) application, potentially resulting in "orphan dialogs" that still exist in the application but are no longer able to be reached during use as the dialog tree "upstream" of the orphan has been modified and may no longer route interactions to the orphaned portion of the tree. Conversely, automated learning may also be used to identify high-traffic dialogs, responses, operations, or other NLI application areas.

Both high and low traffic analysis and other machine learning use cases may be useful in identifying knowledge areas that are more or less popular or relevant, or to identify problems within an NLI application such as misconfigured dialogs or an improperly modeled knowledge base. Continuing the previous example of a VA application with orphan dialogs, it may be determined that a dialog tree is configured incorrectly using parameters that may be too vague, resulting in unusually high traffic to specific areas, while other parameters may be too strict and result in unusually low traffic to certain areas (while in this case, neither instance may necessarily result in completely orphaned dialog portions). It also may be possible to identify failures such as dialogs from which a user exits "ungracefully", for example an incomplete dialog that abruptly terminates a user interaction because there is no longer a child dialog to route the interaction to, so the program mistakenly considers the interaction concluded. Machine learning may also be useful identifying problems with user input itself, for example words or phrases that may not be understood by an application, resulting in a misrouting of the user's interaction or even a termination of the interaction. Learning may identify "safety nets" or interaction routing designed to handle exceptions, such as routing a user back to a main dialog menu when input is not understood, and it then becomes possible to identify when these safety nets may be invoked unnecessarily (such as when common phrases are misheard or improperly implemented).

Machine learning may also be used in "similarity rule" based matching, for example to identify whether a user input "almost" matches a programmed dialog option. In cases of near-matches or high similarity, suggestions may be considered, enabling the expansion of NLI applications to cover additional dialog options and make interaction more natural for a user such as by accommodating variations on phrasing, or synonyms for accepted word choices. This may also benefit from probabilistic matching, or identifying what a user likely meant during their interaction, for example to accommodate mispronunciations of accepted words, or mistakes in syntax or phrasing, such as a mispronounced or incomplete idiom (for example, if a user uses the word "supposably" it may be determined that they meant "supposedly").

Another use for automated learning may be to clarify NLI interaction operations, such as by identifying sets of language operators that may be different but have the same triggers or matches (for example, if multiple words result in the same response). In such scenarios, it may be desirable to differentiate between the matches, to make interactions more natural by simulating natural speech substitution of similar words and phrasing rather than giving a rigid, preprogrammed response that is the same every time even when a user varies their input. Such operation may also be useful in reducing false matches by identifying minor variations (as perceived by a machine) that may have major implications (as perceived by a human). For example, "I want to buy" and "I want to sell", which share the same three-word segment "I want to", but have different verbs thereby completely changing the meaning of the phrase despite a seemingly high degree of similarity. Another example may be clarifying the difference between "credit" and "credit card" in a banking use case. In this manner, operation may adapt and improve according to natural user interaction, without extensive manual input or configuration. Additionally, this makes possible the implicit personalization of NLI applications, in that for each user interacting with an application the operation may continuously adapt to their specific interactions and thereby become more "personalized" in its operation. For example, as a user interacts with an application and responds to the results of the interaction, the application alters its behavior based on the user's reactions to improve functionality. In the future, if the same user performs a similar interaction, the results will now be more adapted to them and operation may continue in this fashion to further adapt to each user and personalize their experience.

BRIEF DESCRIPTION OF THE DRAWING FIGURES

The accompanying drawings illustrate several embodiments of the invention and, together with the description, serve to explain the principles of the invention according to the embodiments. It will be appreciated by one skilled in the art that the particular embodiments illustrated in the drawings are merely exemplary, and are not to be considered as limiting of the scope of the invention or the claims herein in any way.

DETAILED DESCRIPTION

Figure 1:
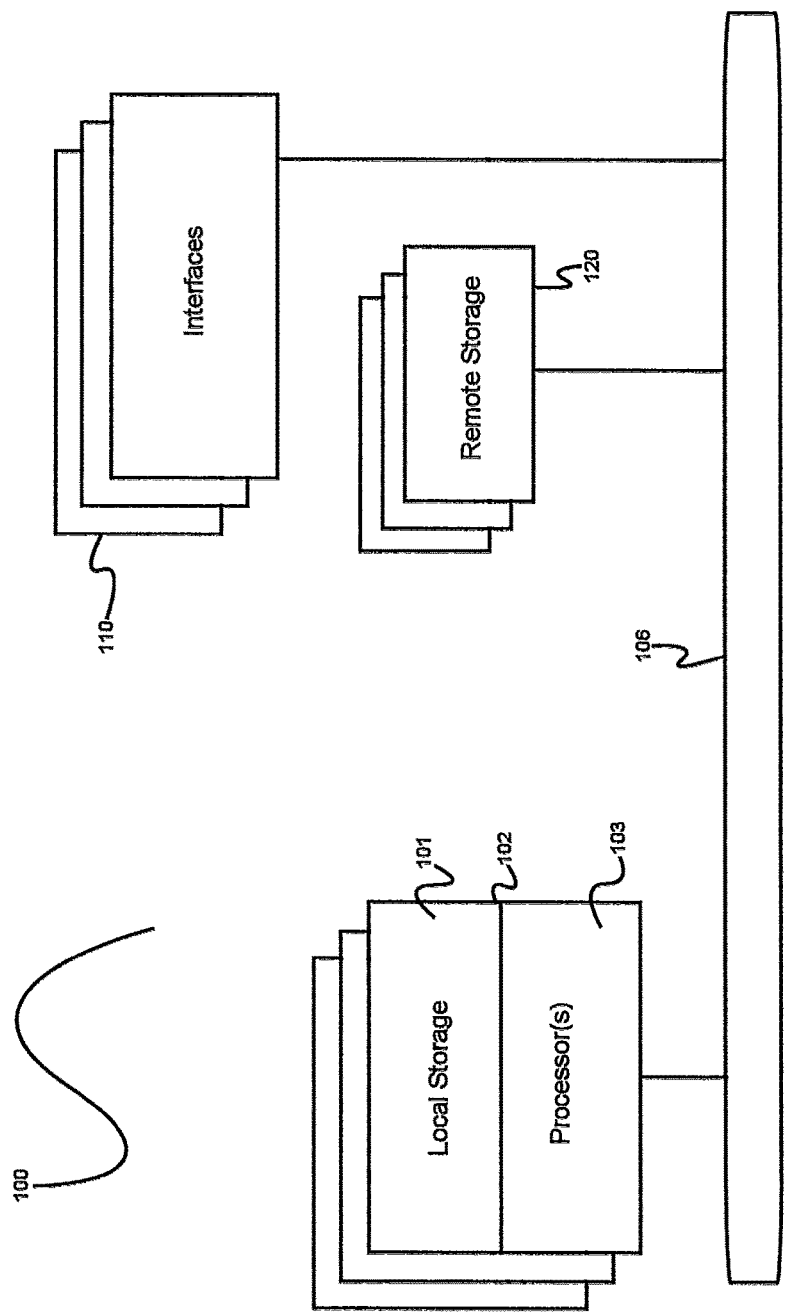
FIG. 1 is a block diagram illustrating an exemplary hardware architecture of a computing device used in an embodiment of the invention.

Accordingly, the inventor has conceived and reduced to practice, in a preferred embodiment of the invention, a natural language data analytics platform, that provides a software application programming interface (API) for integration or interaction with external products or services (such as NLI applications that may provide data for analysis, or request analysis results), and that utilizes machine learning to provide insight and form implicit personalization operations.

One or more different inventions may be described in the present application. Further, for one or more of the inventions described herein, numerous alternative embodiments may be described; it should be appreciated that these are presented for illustrative purposes only and are not limiting of the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural, logical, software, electrical and other changes may be made without departing from the scope of the particular inventions. Accordingly, one skilled in the art will recognize that one or more of the inventions may be practiced with various modifications and alterations. Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Referring now to FIG. 1, there is shown a block diagram depicting an exemplary computing device 100 suitable for implementing at least a portion of the features or functionalities disclosed herein. Computing device 100 may be, for example, any one of the computing machines listed in the previous paragraph, or indeed any other electronic device capable of executing software- or hardware-based instructions according to one or more programs stored in memory. Computing device 100 may be adapted to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 100 includes one or more central processing units (CPU) 102, one or more interfaces 110, and one or more busses 106 (such as a peripheral component interconnect (PCI) bus). When acting under the control of appropriate software or firmware, CPU 102 may be responsible for implementing specific functions associated with the functions of a specifically configured computing device or machine. For example, in at least one embodiment, a computing device 100 may be configured or designed to function as a server system utilizing CPU 102, local memory 101 and/or remote memory 120, and interface(s) 110. In at least one embodiment, CPU 102 may be caused to perform one or more of the different types of functions and/or operations under the control of software modules or components, which for example, may include an operating system and any appropriate applications software, drivers, and the like.

CPU 102 may include one or more processors 103 such as, for example, a processor from one of the Intel, ARM, Qualcomm, and AMD families of microprocessors. In some embodiments, processors 103 may include specially designed hardware such as application-specific integrated circuits (ASICs), electrically erasable programmable read-only memories (EEPROMs), field-programmable gate arrays (FPGAs), and so forth, for controlling operations of computing device 100. In a specific embodiment, a local memory 101 (such as non-volatile random access memory (RAM) and/or read-only memory (ROM), including for example one or more levels of cached memory) may also form part of CPU 102. However, there are many different ways in which memory may be coupled to system 100. Memory 101 may be used for a variety of purposes such as, for example, caching and/or storing data, programming instructions, and the like. It should be further appreciated that CPU 102 may be one of a variety of system-on-a-chip (SOC) type hardware that may include additional hardware such as memory or graphics processing chips, such as a Qualcomm SNAPDRAGON™ or Samsung EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 110 are provided as network interface cards (NICs). Generally, NICs control the sending and receiving of data packets over a computer network; other types of interfaces 110 may for example support other peripherals used with computing device 100. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 110 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 1 illustrates one specific architecture for a computing device 100 for implementing one or more of the inventions described herein, it is by no means the only device architecture on which at least a portion of the features and techniques described herein may be implemented. For example, architectures having one or any number of processors 103 may be used, and such processors 103 may be present in a single device or distributed among any number of devices. In one embodiment, a single processor 103 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 120 and local memory 101) configured to store data, program instructions for the general-purpose network operations, or other information relating to the functionality of the embodiments described herein (or any combinations of the above). Program instructions may control execution of or comprise an operating system and/or one or more applications, for example. Memory 120 or memories 101, 120 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a Java™ compiler and may be executed using a Java virtual machine or equivalent, or files containing higher level code that may be executed by the computer using an interpreter (for example, scripts written in Python, Perl, Ruby, Groovy, or any other scripting language).

Figure 2:
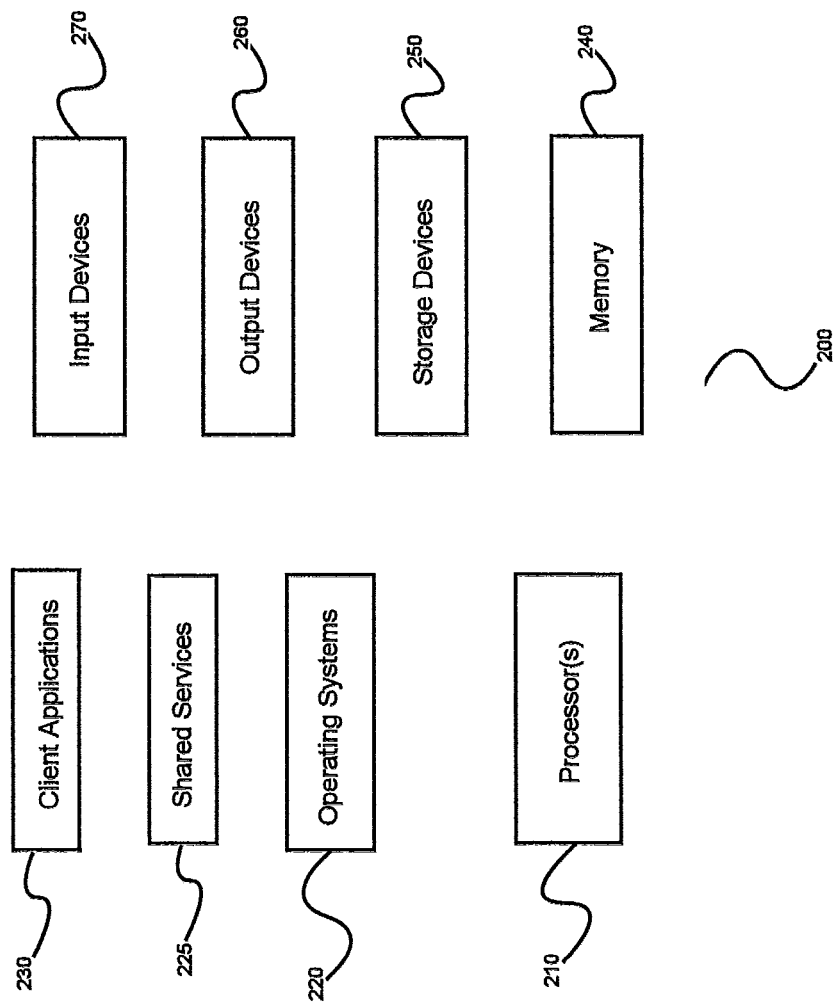
FIG. 2 is a block diagram illustrating an exemplary logical architecture for a client device, according to an embodiment of the invention.

In some embodiments, systems according to the present invention may be implemented on a standalone computing system. Referring now to FIG. 2, there is shown a block diagram depicting a typical exemplary architecture of one or more embodiments or components thereof on a standalone computing system. Computing device 200 includes processors 210 that may run software that carry out one or more functions or applications of embodiments of the invention, such as for example a client application 230. Processors 210 may carry out computing instructions under control of an operating system 220 such as, for example, a version of Microsoft's WINDOWS™ operating system, Apple's Mac OS/X or iOS operating systems, some variety of the Linux operating system, Google's ANDROID™ operating system, or the like. In many cases, one or more shared services 225 may be operable in system 200, and may be useful for providing common services to client applications 230. Services 225 may for example be WINDOWS™ services, user-space common services in a Linux environment, or any other type of common service architecture used with operating system 210. Input devices 270 may be of any type suitable for receiving user input, including for example a keyboard, touchscreen, microphone (for example, for voice input), mouse, touchpad, trackball, or any combination thereof. Output devices 260 may be of any type suitable for providing output to one or more users, whether remote or local to system 200, and may include for example one or more screens for visual output, speakers, printers, or any combination thereof. Memory 240 may be random-access memory having any structure and architecture known in the art, for use by processors 210, for example to run software. Storage devices 250 may be any magnetic, optical, mechanical, memristor, or electrical storage device for storage of data in digital form (such as those described above, referring to FIG. 1). Examples of storage devices 250 include flash memory, magnetic hard drive, CD-ROM, and/or the like.

Figure 3:
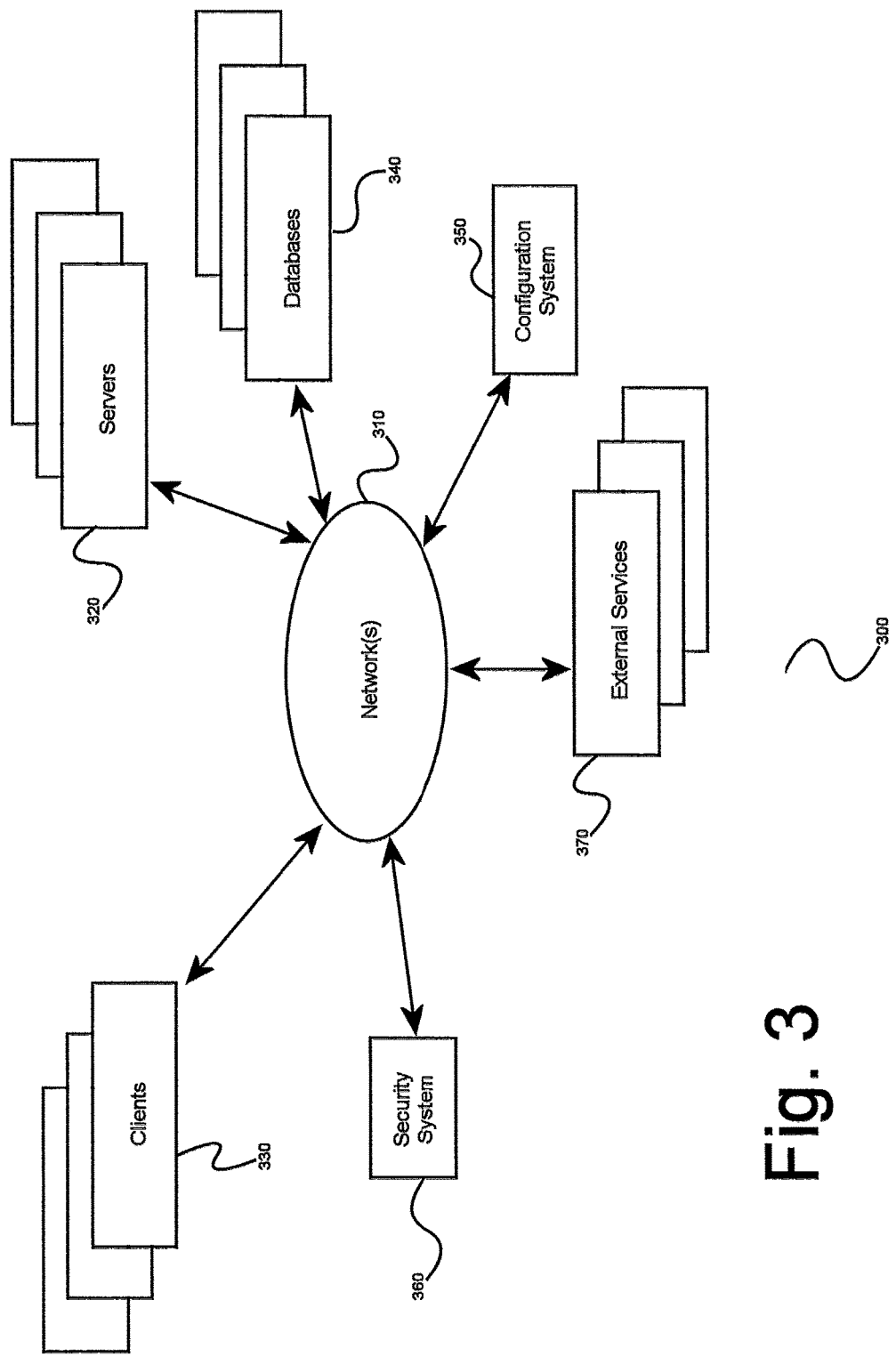
FIG. 3 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 3, there is shown a block diagram depicting an exemplary architecture 300 for implementing at least a portion of a system according to an embodiment of the invention on a distributed computing network. According to the embodiment, any number of clients 330 may be provided. Each client 330 may run software for implementing client-side portions of the present invention; clients may comprise a system 200 such as that illustrated in FIG. 2. In addition, any number of servers 320 may be provided for handling requests received from one or more clients 330. Clients 330 and servers 320 may communicate with one another via one or more electronic networks 310, which may be in various embodiments any of the Internet, a wide area network, a mobile telephony network (such as CDMA or GSM cellular networks), a wireless network (such as WiFi, Wimax, LTE, and so forth), or a local area network (or indeed any network topology known in the art; the invention does not prefer any one network topology over any other). Networks 310 may be implemented using any known network protocols, including for example wired and/or wireless protocols.

In addition, in some embodiments, servers 320 may call external services 370 when needed to obtain additional information, or to refer to additional data concerning a particular call. Communications with external services 370 may take place, for example, via one or more networks 310. In various embodiments, external services 370 may comprise web-enabled services or functionality related to or installed on the hardware device itself. For example, in an embodiment where client applications 230 are implemented on a smartphone or other electronic device, client applications 230 may obtain information stored in a server system 320 in the cloud or on an external service 370 deployed on one or more of a particular enterprise's or user's premises.

In some embodiments of the invention, clients 330 or servers 320 (or both) may make use of one or more specialized services or appliances that may be deployed locally or remotely across one or more networks 310. For example, one or more databases 340 may be used or referred to by one or more embodiments of the invention. It should be understood by one having ordinary skill in the art that databases 340 may be arranged in a wide variety of architectures and using a wide variety of data access and manipulation means. For example, in various embodiments one or more databases 340 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 360 and configuration systems 350. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 360 or configuration system 350 or approach is specifically required by the description of any specific embodiment.

Figure 4:
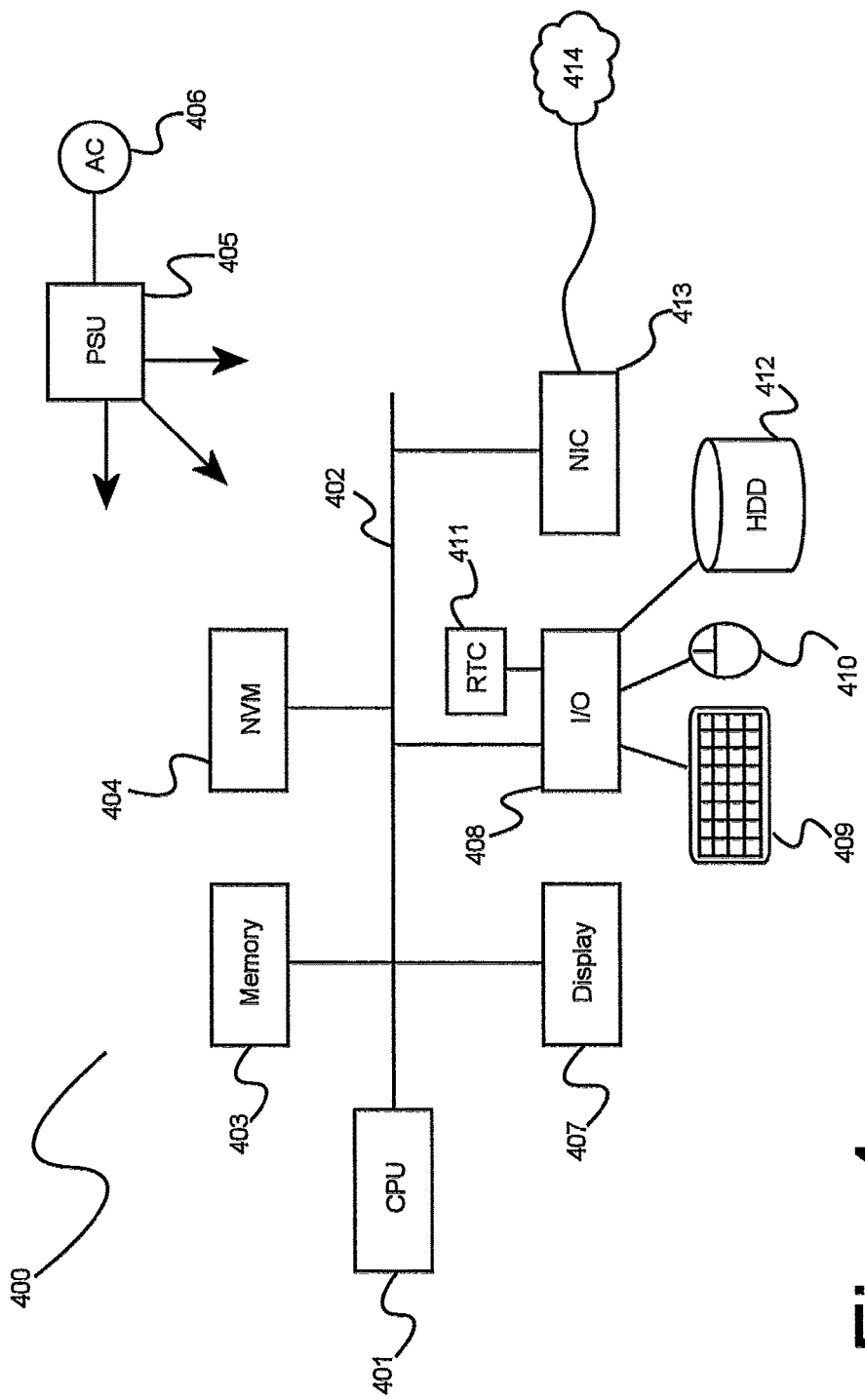
FIG. 4 is another block diagram illustrating an exemplary hardware architecture of a computing device used in various embodiments of the invention.

FIG. 4 shows an exemplary overview of a computer system 400 as may be used in any of the various locations throughout the system. It is exemplary of any computer that may execute code to process data. Various modifications and changes may be made to computer system 400 without departing from the broader scope of the system and method disclosed herein. CPU 401 is connected to bus 402, to which bus is also connected memory 403, nonvolatile memory 404, display 407, I/O unit 408, and network interface card (NIC) 413. I/O unit 408 may, typically, be connected to keyboard 409, pointing device 410, hard disk 412, and real-time clock 411. NIC 413 connects to network 414, which may be the Internet or a local network, which local network may or may not have connections to the Internet. Also shown as part of system 400 is power supply unit 405 connected, in this example, to ac supply 406. Not shown are batteries that could be present, and many other devices and modifications that are well known but are not applicable to the specific novel functions of the current system and method disclosed herein. It should be appreciated that some or all components illustrated may be combined, such as in various integrated applications (for example, Qualcomm or Samsung SOC-based devices), or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

Conceptual Architecture

Figure 5:
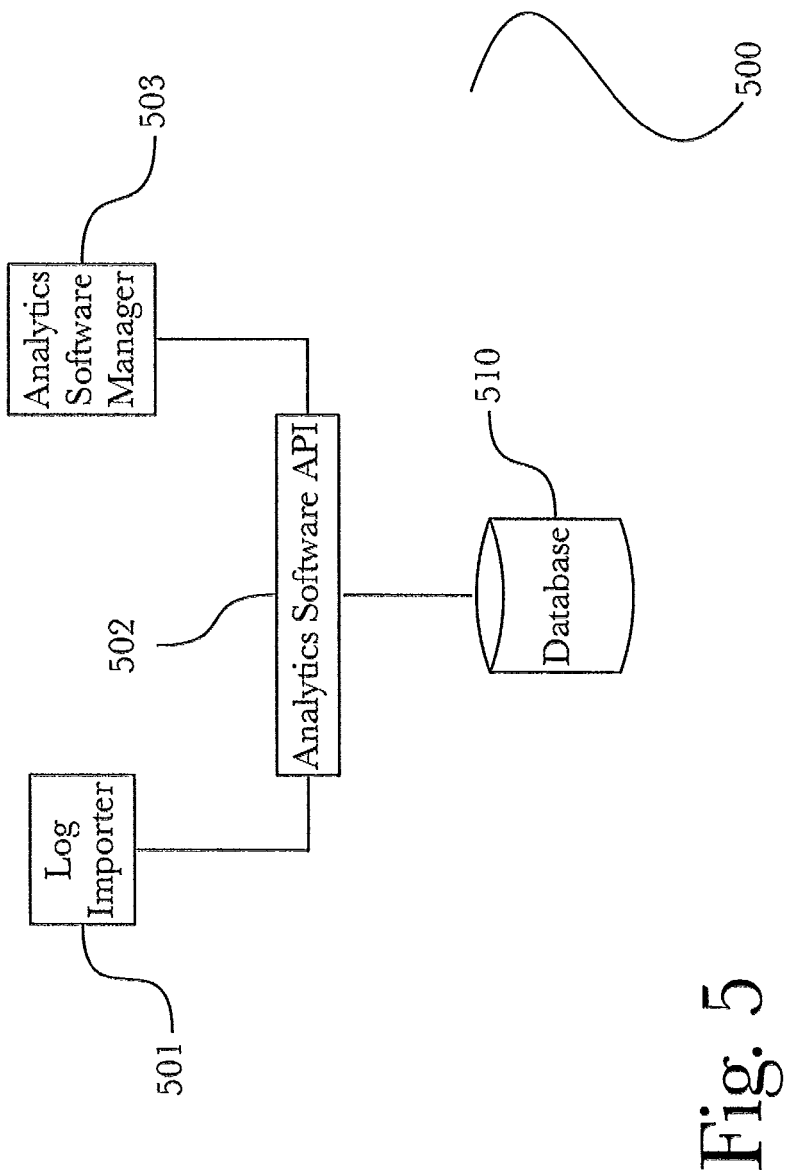
FIG. 5 is a block diagram of an exemplary system for natural language data analytics, according to a preferred embodiment of the invention.

FIG. 5 is a block diagram of an exemplary system 500 for natural language data analytics, according to a preferred embodiment of the invention. According to the embodiment, a log importer 501 may receive information logs from NLI-enabled software applications or services (such as external software products or services that may be in communication with a system 500), and may make these logs available to the system of the invention via a software analytics API 502. This information may then be stored (such as in a database 510 or other suitable data storage means) in an organized fashion for NLI-based operations, such as database queries from a variety of client hardware or software products or services, as well as use in natural language processing (NLP) analysis.

According to the embodiment, a natural language interaction query language (NLIQL) may be used by an analytics API 502 to process NLI data (for example, from NLI application logs imported by the log importer 501) and store this data as sequences of events. An analytics manager 503 may be utilized such as to facilitate management or control of analytics operations, for example to configure analytics processing behavior or submit NLI queries manually, or any other of a variety of potentially desirable uses for NLI analytics applications. A variety of code and query examples and details are described below, but it should be appreciated that while specific mention may be made of particular functions or details, these examples are merely meant to be exemplary and are by no means limiting of the invention or its claims.

Each session may be represented as a flat sequence of events, where the basic definition of each event is as follows: request events comprising inputs sent to the system; response events comprising responses coming from the system; and path events comprising what happens in between.

Each session may be modeled as an ordered sequence of events, and may be represented in the order in which they occur in the NLI application. All events may belong to a "transaction", and each transaction may begin with a request event, continue with a list of path events and finally end with a response event. Individual events may have properties, that may be stored and made searchable within the NLIQL, and that may differ according to the type and content of a particular event (for example, two request events may have different properties, or all request events may have different properties form all response events, for example).

The data structure is flattened for easier searching, with each event having a session-id property and a transaction-id property. The data model can be summed up as follows:

Sessions
  applicationName: the name of the application as a String
  beginTime: the start time of the session, as a UTC timestamp
  endTime: the end time of the session, as a UTC timestamp
  eventCount: the number of events in the session
  events: list of the events (see below)
  session metadata: NLI application metadata assigned on session level
  variable changes: variable changes which occur when the session is ended (all other variable changes are logged as variable changes of certain events)

Events
  type: request/response/path
  sessionId: UUID as a string
  transactionIndex: position of the transaction within the session. starts with 0
  eventIndex: position of the event, within the transaction. starts with 0
  id: unique id of the event as a string. Composed from sessionId, transactionIndex and eventIndex
  applicationName: as on session level
  beginTime: as on session level
  endTime: as on session level Request Events
  Request events represent input being sent to the NLI application. NLI application input consists of the natural language input, and additional information, sent as request parameters. Request events hold the following properties:
  userInput: the natural language input, as a String
  requestParameters: a map of request parameters and values, as strings.

Response Events
  Response events represent output being sent as a response from the NLI application. NLI application output consists of the natural language response, an emotion name and optionally other information sent as output parameters. Since there is no transaction level in the Analytics API data representation, response events hold transaction level metadata as well. Response events hold the following properties:
  answerText: the natural language response text, as a string
  emotion: the NLI application response emotion, as a string
  viewVariables: a map of output parameters
  transaction metadata Path Events
  Path events represent the internal computation steps performed by the NLI application. Path events hold the following properties:
  flow and vertex metadata: metadata assigned to flows and vertices.
  flow and session variable changes: whenever a flow or session variable changes value within the scope of a path event, the new value is logged
  pathType: one of the path event types, as seen below Path Event Types
  Script Events:
  session-script: BeginDialogue, Preprocessing
  flow-script: OnTop, OnDrop
  variable-change: side-effect variable change
  Flow Stack Manipulation
  raise-flow: a flow is put on the stack
  pause-flow: a flow is "paused", i.e. another flow becomes the topmost flow
  continue-flow: a transition is matching, flow stays on top
  resume-flow: a flow is resumed after being paused
  drop-flow: a flow is dropped from the stack
  Listener and Flow Execution
  flow-trigger: a flow trigger matched
  listener: a listener was executed
  output: an output node was traversed
  transition: a transition was traversed
  script: a script node was traversed
  flow-node: a flow node was traversed Session Scope Negations
e.userInputwords!~"goodbye"
  This would match a first transaction.
!(e.userInputwords~~"goodbye")
  Matches any transaction not having "goodbye".
!(A, B, C)
  Negates any matches on "A", "B", or "C"
listAll inputs where trigger is something in (listAll flowIDs that . . . )
  Current implementations in the art provide for:
listAll e-userinput: e2.flowID==in {aaa, bbb, ccc, . . . }
  This is a limited way of doing disjunction that avoids nesting, a preferable approach is to turn {aaa, bbb, ccc, . . . } into a result of an NLIQL query.

Commands
  Exemplary commands that may be supported by an NLIQL are described below. For custom commands invoking plugins, see section 5 below. For explanations of how the commands may be used, see below.

List all
  The command lists all events that match the query. The form of the command is
  listAll or la
  Returns a list of results.

List Unique
  The command lists all unique events that match the query. The form of the command is
  listUnique or lu
  Returns a list.

Count all
  The command counts all events that match the query. The form of the command is
  countAll or ca
  Returns an integer.

Count Unique
  The command counts all unique events that match the query. The form of the command is
  countUnique or cu
  Returns an integer.

Distribute
  The command counts events for each level in a nominal variable. The form of the command is
  distribute or d Returns a table containing variable levels and corresponding frequencies, ranked from highest to lowest.
Trend The command calculates salient trends in the differences between two frequency distributions. The command is trend or t Returns a table containing variable levels and corresponding trend saliency scores, ranked from highest to lowest (where a higher score indicates higher conspicuousness).
Customer Analyzers Customer analyzers may be embedded, and they become part of an NLIQL syntax, and appear as if they are part of the language. Customer Analyzers may be considered "Transformers" which transform a query into a more complete lower-level NLIQL query. Core commands may include listAll, countAll, and other such commands (several examples of which are described above).
Automated NLIQL Syntax Extensions For example:
nameSpotter: string This "transformer" takes one set of values (in this case a string) and transforms it into something else.
Inspector On startup, inspects all transformers to determine what can be used in queries. This could also be used as a response to an XfmrAdd event to inspect a newly added transformer. This may be implemented, for example, as a server-wide inspector/Xfmr paradigm that only allows inspection on server startup (since all users would be affected), or with variable or configurable scope of a transformer inspector (i.e., only for one client or even for one group of VAs). Additionally, calls may be made from an NLI analytics engine to third party tools such as a machine learning server, and these calls may be wrapped in an Xfmr event and embedded in an NLIQL for use (this may be seen as an extension of a plugin functionality, described below).
Syntax NLIQL syntax is based on applying the functions described above to a selected area of the data, i.e. that which is to be counted or listed. The query is carried out on events, and results (e.g. counts and frequency distributions) are for events, not sessions (but sessions can be counted by e.g. searching unique session ids). Building on this basis, further constraints and limitations can be optionally added. The present section describes the built-in NLIQL syntax with examples. The syntax of external commands is covered in section 5 below.
Basic Syntax The basic syntax of NLIQL is as follows:
<command><selection> where <command> is one of the commands from section 3 and <selection> is a path event (numbered in case of multiple events, see examples below) on which the command is performed. The example below applies the la command to user input events, producing a list of all user inputs.
la e.userInput
Constraint Operators An NLIQL may allow further constraints to be added to the basic syntax, providing for more powerful and flexible searches. The syntax is:
<command><selection>:<constraints>

The constraints, listed after the colon, are events selected according to certain values. Multiple constraints can be specified, separated by comma. The following constraint value operators are supported:

Equals

Used for exact matches, e.g. specifying that a constraint must have a specific value. The example below lists all unique user inputs in the month of December 2013:
lu e1.userInput:e1.beginTime=="2013-12"

The equals-operator is faster than the matches-operator described below, and the former is recommended if an exact match is involved.
Not Equals Used for exact matches, such as specifying that a constraint must not have a specific value. The example below gives a distribution of user inputs except those from December 2013:
d e1.userInput:e1.beginTime!="2013-12"
Matches Used for matching at the word level. This function is analogous to a "contains" function. The example below counts all user inputs where the user has mentioned the word "restaurant":
ca e1.userInput: e1.userInput~="restaurant"

The matching here is done at the word level, not character by character, and the query above corresponds to a "contains" constraint. However, it is also possible to construct regular-expression like queries using wildcard operators. The example below gives a frequency distribution of user inputs coming from any location in Norway:
d e1.userInput: e2.1v:Area~=".+, Norway"
Not Matches Used for matching at the word level where a stop word is needed to exclude some word from the search. The example below counts all user inputs, except those where the user mentioned the word "restaurant":
ca e1.userInput: e1.userInput!~ "restaurant"
Less than Used for limiting a value to being less than a given threshold. The example below counts all user inputs logged before May 1, 2013:
ca e1.userInput:e1.beginTime<"2013-05-01T00:00"

Non-strict inequality is supported with "less than or equal to": >=.
Greater than Used for limiting a value to being less than a given threshold. The example below counts all user inputs logged after May 1, 2013:
ca e1.userInput:e1.beginTime>"2013-05-01T00:00"

Non-strict inequality is supported with "greater than or equal to": <=.
Set Constraints An NLIQL may support set constraints that allow queries where a match is found among one of the members of a specified set. The general syntax is a follows:
<command><selection>:e.<property><operator> in {<variable 1>, . . . , <variable n>}

The example below returns a table of frequencies of user inputs by geographical area, matching the following criteria: inputs must contain the word "translate", stem from December 2013, and contain either the word "Spanish" or the word "French".
d e2.1v:Area, e1.userInput:e1.userInput~="translate", e1.beginTime=="2013-12", e1.userInput~=in {"spanish", "french"}

The example above uses discrete values in the set, but ranges are also supported. The example below illustrates the use of ranges, in this case weekdays, in a search for the distribution of user inputs sent on weekends:
d e1.userInput:e1.beginTime==in {friday . . . sunday}

It is also possible to specify time ranges using months, e.g. to find a sample of unique user inputs logged in summer:

sample lu e1.userInput:e1.beginTime==in {june . . . august}

Event Co-Indexing

The data model used in the Analytics API allows for representing sequences of events in a natural manner, unlike a conventional relational database. In the NLIQL syntax, numbers are used to co-index events. In the example below, the user input and the start time constraints refer to the same event, as indicated by the number 1:

lu e1.userInput:e1.userInput~="beer", e1.beginTime=="2013-12"

By using event co-indexing we can simultaneously specify constraints on different events within the same session. The events with similar co-indexing numbers below refer to same events; in cases where the numbers differ they refer to different events:

d e3.fv:language, e4.1v:Area:e1.userInput~="translate", e3.fv:language~=in {"spanish", "french"}

The matching events (if any) will always be within the same session.

Sequential Constraint Operators

The data on which an NLIQL operates are modelled as a stream of events with properties, implying that the data nodes are connected. NLIQL allows specifying the order of events, as in the query below which returns the distribution of user inputs from sessions where the user said "beer", the VA said "OK", and the user input preceded the reply:

d e1.userInput:e1.userInput~="beer", e2.outputtext~="ok", e1→e2

It is furthermore possible to define a skip-to condition in the following manner:

e1→{condition}→e2

The example below returns a sample of user inputs and corresponding answers from September 2013, where users have mentioned the word "pizza", and where e2 has "response" as its type. Events of other types that might intervene between the two are ignored by the query.

sample la e1.userInput, e2.answerText: e1.beginTime=="2013-09", e1.userInput "pizza", e1-{type="response"}>e2 limit 10000

Modifiers

In addition to the constraints operators listed above, NLIQL allows a number of optional modifiers. Modifiers are listed at the end of the query, as illustrated below:

<command><selection>:<constraints><modifiers>

Three exemplary modifiers that may be supported are:

Order by

The syntax for sorting results is based on SQL, and the "order by" modifier takes two arguments: a constraint variable, and either "asc" (ascending) or "desc" (descending). The example below lists all user inputs where the user has mentioned the word "beer", listed alphabetically in ascending order:

la e1.userInput:e1.userInput~="beer" order by e1.userInput asc

Sample

Sample returns a sample from the data matching the query. The sample modifier is only applicable when the potential size of the query result (unmodified) exceeds the maximum number of results returned by default (10,000). Sample is only really effective for complex queries where multiple binding phases are needed. The modifier works by binding the first 10,000 results. The query below returns a sample of user inputs where the user has mentioned the words "tell" and "joke":

la e1.userInput:e1.userInput~="tell", e1.userInput~="joke" sample

Limit

Limit sets an upper limit to the query result. The default is 10,000, and when a query exceeds this only the first 10,000 results are reported. Thus, the following query returns 10,000 hits:

countUnique e1.sessionId:e1.beginTime=="2013-04"

However, by using the limit modifier it becomes clear that the actual result is in excess of 86,000:

count Unique e1.sessionId:e1.beginTime=="2013-04" limit 100000

Time Syntax

Times in the log data are normalized to UCT (coordinated universal time) upon import. Time can be referred to in a number of different ways, including hours, days, and months. The syntax varies depending on the query. The examples below illustrate how time constraints can be imposed on the queries. See section 4.2 above for examples of how to use time constraints as cut-off points for a query.

Year

List a sample of unique user inputs from 2014:

sample lu e1.userInput:e1.beginTime=="2014"

Month

List a sample of unique user inputs from November 2013:

sample lu e1.userInput:e1.beginTime=="2013-11"

It is also possible to search for inputs from a given month irrespective of year:

sample lu e1.userInput:e1.beginTime==january

Day

List a sample of unique user inputs from Christmas day 2013:

sample lu e1.userInput:e1.beginTime=="2013-12-25"

It is also possible to search for inputs from specific weekdays:

sample lu e1.userInput:e1.beginTime==monday

Hour

List a sample of unique user inputs occurring after 1 am UTC on Jan. 31, 2013:

sample lu e1.userInput:e1.beginTime<"2013-05-01T01:00"

Months and Weekdays as Ranges

See above for examples of how to use months or weekdays as set constraints.

Trend Syntax

Trends are defined as salient differences between frequency distributions from two different time windows. The frequency distributions are created with the distribute command and passed as arguments to the trend command. The general syntax is:

trend<selection>:(<distribute query>), (<distribute query>)

The selection for the trend command should be identical to the selection in the distribute queries. The example below returns a table of saliency trend scores for user inputs from November to December.

trend e.userInput:(d e.userInput:e.beginTime=="2013-11"), (d e.userInput:e.beginTime=="2013-12")

Plugins

NLIQL supports custom modules to be used in searches, allowing for integration of functionalities like NLP analysis into NLIQL. As described previously, system calls to thirdparty tools may be integrated in a similar manner, for example by wrapping a system call in a transformer event for embedded use in NLIQL syntax. The general syntax is:

<NLP command> (<NLIQL query>)

An exemplary plugin may be:

matches-condition

Which checks a string against a LO [Language Object], for example:

la e1.userInput:

e1.userInput matches-condition ("% CAN_1.PHR")
Another exemplary plugin may be:
classify (c1, c2, . . . cn)
Which may receive an input and the first cx that matches in the input is returned. If nothing matches, returns "UNK" (indicating an unknown match result).
whatLO: match(input)→
Produces a list of all LOs that match input string.
It may be appreciated that plugins such as those described above may be used to provide a fully customizable semantic search:
matches-example (E1, E2, . . . , En, NegE1, NegE2, . . . )
Two exemplary commands are described below.
ConceptMine
The conceptMine command returns the number of inputs that have a certain association score with a specified query. The example below returns a distribution of association scores with the user input "beer", and the number of user inputs for each score value.
conceptMine (listAll e1.userInput:e1.beginTime=="2013-12", e1.userInput~="beer")
AssociateMine
The associateMine command also returns a distribution of association scores and frequencies associated with them, but it also returns the associated terms themselves.
associateMine(minSentenceCount=1) (conceptMine (listAll e1.userInput:e1.beginTime=="2013-12", e1.userInput~="beer"))
Example Queries
Sample Inputs Going to Safetynet
Lists a sample of all user inputs going to the safetynet in January 2014:
sample la e1.userInput:e1.beginTime=="2014-01", e2.md:SAFETY_NET=="true"
Sample Inputs Containing the Word "Pizza" Going to Safetynet
Lists a sample of all user inputs going to the safetynet, where the user has mentioned the word "pizza":
sample la e1.userInput, e2.answerText: e1.userInput~="pizza", e3.md:SAFETY_NET=="true"
Find Out where Inputs Containing "Pizza" End Up
Returns a distribution of flows triggered by the user mentioning the word "pizza":
d e1.userInput, e2.fname:e1.userInput~="pizza"
Retrieve Locations in the UK where Users Ask for Indian or Chinese Food
Returns a distribution of locations in the UK where the user input contained the word "restaurant" and either the word "Chinese" or "Indian":
d e2.1v:Area:e1.userInput~="restaurant", e1.userInput~=in {"chinese", "indian"}, e2.1v:Area~=".+, United Kingdom"
Retrieve Most Salient Trends in Analysis Category from November to December
Returns a table of sorted analysis categories, with interesting trends displayed first:
trend e.md:AnalysisCategory:(d e.md:AnalysisCategory: e.beginTime=="2013-11"), (d e.md:AnalysisCategory:e.beginTime=="2013-12")

Further according to the embodiment, a log importer may receive (such as from currently running applications) or import (such as from a database or other storage) log files comprising NLI data received from a variety of sources such as external NLI applications, and may then make these logs available to the analytics API for processing and storage using an NLIQL as described above. The logfiles may contain such information as data regarding content of conversations (what people say) and system actions based on those conversations, as well as detailed information on what the system is doing internally to analyze or process those conversations (for example, event logs from the NLI applications detailing their internal activity in addition to the actual user conversations and input).

Log data may comprise information about what people say and what the system responds, or detailed information about what actions the system is doing internally to find out the response to what people say.

In addition to processing based on log file properties and contents, an NLIQL may be used for engine matching (search in logs for things matching a condition). LOB analysis (see what language objects match a specific input), trend detection (see what things are trending), categorization by date/month/other time unit, engine categorization (use engine matching to categorize inputs). NLI Analytics may utilize a modular architecture so new commands can be uploaded and added to the server.

Additionally, the concept of "log data augmenters" may be utilized to further expand on the functionalities described previously. Log data augmenters may generally be used to increase the usefulness of a particular log file by inserting or appending additional, complementary data during processing ("data adornments"), or by calculating or deriving new data from what is available ("data aggregations"). Data adornments may be additional data saved and associated with a particular session, transaction or event and may be added to a log file so that it is made available anytime the log file is accessed (an example may be a "sentiment" value attached to logs to quickly quantify a consumer's attitude in a session). In this manner it becomes possible to form a more complete model of what users are talking about, looking for, or generally "doing", by forming an objective model of all aspects of an interaction beyond simple numerical metrics. Data aggregations may be calculated or otherwise derived from log data and may be stored separately such as in a database, rather than being associated with a particular transaction, session, or event. Examples may be the generation of derived traffic pattern data or usage statistics. Log data augmenters may be used in queries against the original or "un-augmented" data, and may be customizable and configurable as needed (such as by a user for a particular purpose, or when new data is available or rules are modified).

Additionally, the use of "session-wide constraints" may be used to form "meta-queries", that may query over a large set of sessions rather than specific portions of data within a session. For example, a query may be used to list all sessions where none of the received user inputs expressed any form of negative sentiment—rather than, for example, a more simplified and less useful query that lists sessions where there is a user input expressing a non-negative sentiment. A variation of such a feature may be the utilization of set-based operations and constraints, enabling operations on sets of data or results of queries and allowing the utilization of set operations such as union, intersection, difference, and other operations that may be applied to sets of data.

To enhance query results and operations, data may be "aged" to ensure relevancy of results. For example, a set of data may have time-based information associated with it, making it easy to track the length of time since the data was received, analyzed, derived, or last queried (or any other such time-based operation or event information). Based on data aging values, different rules may be applied for queries or analysis of that data, or different data augmenters may be automatically applied to the aged data.

Further according to the embodiment, an analytics manager may submit queries to an analytics API (such as from a human user or from software applications or services interacting with the API), such as to query for dialogues (conversations or other NLI interactions that may have been logged), specific events or sequences of events (such as taking into account the ordering of events), or more natural "semantic search" queries such as querying using natural language rather than strict command syntax as is common in the art. For example, an NLIQL may be configured with specific "language conditions" that may be used to enable natural language queries based on linguistic recognition rather than strict command matching, facilitating a more natural query interface.

Analytics API provide functionality for mining and analyzing the NLI application interaction data, using a query language: NLIQL.

Analytics API may power a wide range of analytics user interfaces serving a wide range of different type of users and purposes. NLI data may be very rich data containing what the enterprise customers actually say, so gives a direct feed of the voice of the customer(s) into the enterprise. Unlocking this data gives a range of business value examples, such as: improving products (ex: Dell marketing); improving the customer engagement during customer interactions, thereby possibly increasing sales and customer satisfaction; improving customer service; improving business processes; ad hoc market/customer analysis, such as "what are they interested in?", "what are they actually saying?", and "in which context?", "what do they actually say when they show a negative sentiment and end up not buying or cancelling?"; and improving the NLI solution.

For an enterprise business some dashboard examples may include: dashboards showing "voice of the customer", "trends" etc. for business management; dashboards showing "new trends", "top issues", "safety net usage", "resolution rates", "satisfaction", tc . . . for customer service management; dashboards showing "trending topics", "sentiment", "intent", (and so on) for marketing/social media/monitoring/product/business management; and dashboards showing "solution performance, metrics, KPIs" for NLI solution management.

The enterprise business would also: do traditional business intelligence (BI) using rich data further enhanced by results of natural language analytics retrieved using an analytics API and integrated into their BI tool of choice; do more modern BI "big data" or "datamining" or "exploratory analysis earning what you don't know"; and the enterprise business may also use the data to (semi-automatically) feed back into and improve the NLI solution.

Analytics API can, for example, be used for: improving NLI solutions, by looking at how people have used it (improve the NLI rules so that it understands what users say, extend the VA functionality, by looking at what people want to do, look at how dialogues and flows can be optimized); measuring the performance of NLI solutions, by calculating KPIs and doing traffic analysis ("How many dialogues and unique users are there each day?", "What areas of the solution knowledge are most frequent?", "How many issues are resolved/not resolved each day?", "How many users do not get an answer to their question?"); finding out what people do talk about, by applying custom natural language processing (NLP) analysis to NLI application interaction data and other textual data ("What are the top concepts?", sentiment detection among users, machine learning, trending, or automated data clustering); and semantic search (search for user inputs and dialogues that match a certain condition written in the query language; the condition can be automatically generated from examples). Analysis and semantic search capabilities are not necessarily limited to NLI application interaction data, but may also be used to analyze any kind of textual inputs.

To improve integration and interaction with external applications and maximize the utility of the NLI analytics API and NLIQL, the API may utilize RESTful APIs common in the art, as well as providing scripting functionality and additional extendable options common in software applications, such as to facilitate interaction with a broad variety of services and applications, without necessarily requiring additional work to be done to enable integration on the client's end. Utilizing the extendable nature of the invention additional custom text or speech analyzers may be utilized such as for integration with existing products. For example, the invention may be integrated with an existing speech-to-text system such as a virtual assistant like SIRI™ or other such products or services. In this manner, the system of the invention may be useful in a variety of arrangement with various services and products, and may be adapted to integrate with a variety of additional or alternate services or products according to the invention, such as via REST APIs, JSON, scripting, third party queries or applications, or any other software-based integration or interaction means according to the intended use case, for example various user interfaces, query terminals, or analyzer modules. Additionally, a plurality of independent analyzers may be utilized to perform distributed analysis during operation, making a system more robust against failures and anomalies while also improving scalability and modularity to make it easy to adapt a system to various use cases and arrangements.

Additionally, the semantic search functionality offered by the invention may be utilized to expand the functionality of traditional search engines, such as by extending a search engine through the use of language rules or conditions. For example, in an exemplary integrated arrangement with a search engine such as those offered by GOOGLE™, BING™, or other search providers, a user may write a language condition and use the condition to search volumes of text-based information. A user may also further expand this functionality by automatically generating a language condition from text examples, and then using the generated results to search. The volumes of text-based information could be any appropriate body of text data, such as (for example) text-based web pages (such as WIKIPEDIA™ or similar information repositories that contain a large amount of searchable text), or logged information such as from NLI applications (such as to quickly search for relevant information in an NLI application's output or log files according to the specified conditions).

A further use according to the embodiment, may be the implementation of "implicit personalization" based on NLI analysis. In such a use case, the results of natural language analytics may be used to tailor the user experience or operation of a software product or service, for example in a manner similar to targeted advertising common in the art. Rather than simply identifying a user's interests for the purpose of displaying relevant advertisements, the user's language patterns, style, vocabulary, or other linguistic attributes may be analyzed and used to personalize a variety of aspects or functions of a software product or service, such as to display menus or messages in a more accessible manner, to perform search queries according to the user's particular language patterns (optionally utilizing language conditions as search queries, as described above, to enhance the results given for a user's submitted natural language query), or to recognize a user's vocabulary for specific words or phrases and adapt behavior to react to those language elements during use—for example, to make interaction "feel" more natural to the user by enabling them to use their natural linguistic patterns as if they were speaking or typing to another person, rather than (as is common in the art) requiring a particular manner of input in order for the software to properly recognize or process the interaction. In this manner, not only may the operation or results of software be made more useful to the user, but the overall experience may be enhanced by making interaction more linguistically accessible to the user.

Detailed Description of Exemplary Embodiments

Figure 6:
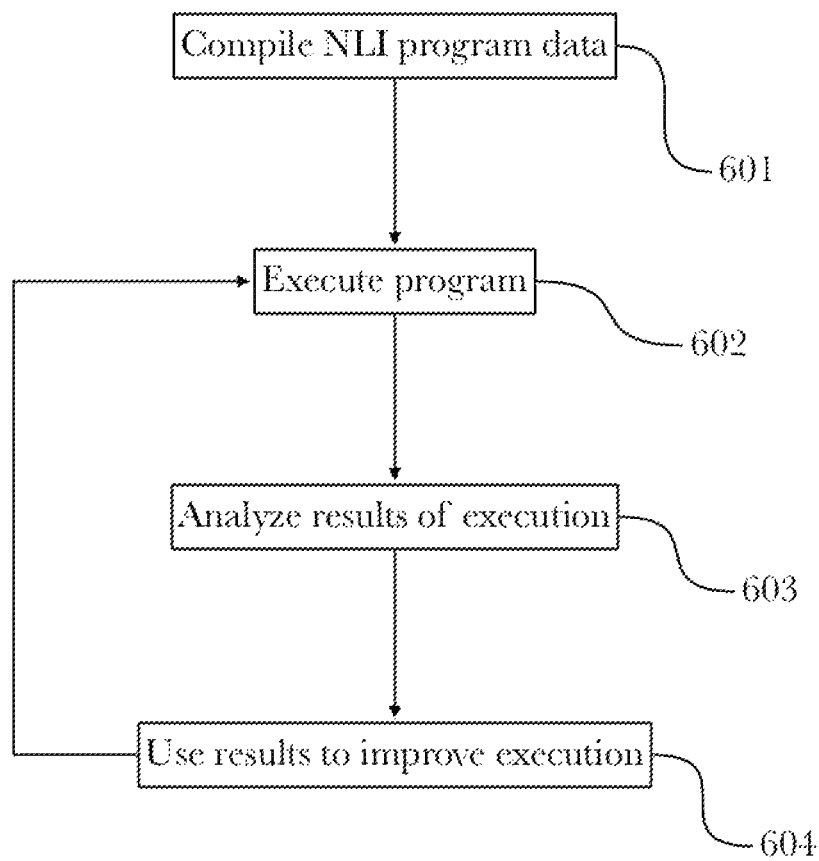
FIG. 6 is a method flow diagram illustrating an exemplary method for adaptive natural language analytics, according to a preferred embodiment of the invention.

FIG. 6 is a method flow diagram illustrating an exemplary method 600 for adaptive natural language analytics, according to a preferred embodiment of the invention. According to the embodiment, NLI-based program data may be compiled and built in a first step 601, such as to produce a functional software application or service. This software may then execute in a second step 602, performing operations according to its nature and implementation. The results of execution may then be analyzed in a third step 603, such as by an NLP analysis server (as described above, referring to FIG. 5), and the results of the analysis may then be used to improve the operation of the software through machine learning or other adaptive means in a fourth step 604. Operation may then continue in a cyclic fashion, wherein software executes, the results are analyzed, and the operation is improved based on the analysis, thereby effecting an automated and adaptive software process repeating as appropriate from a second step 602. In this manner, human interaction may be minimized to improve efficiency, allowing language analytics to continue processing in a meaningful and productive fashion without requiring human input or review.

Figure 7:
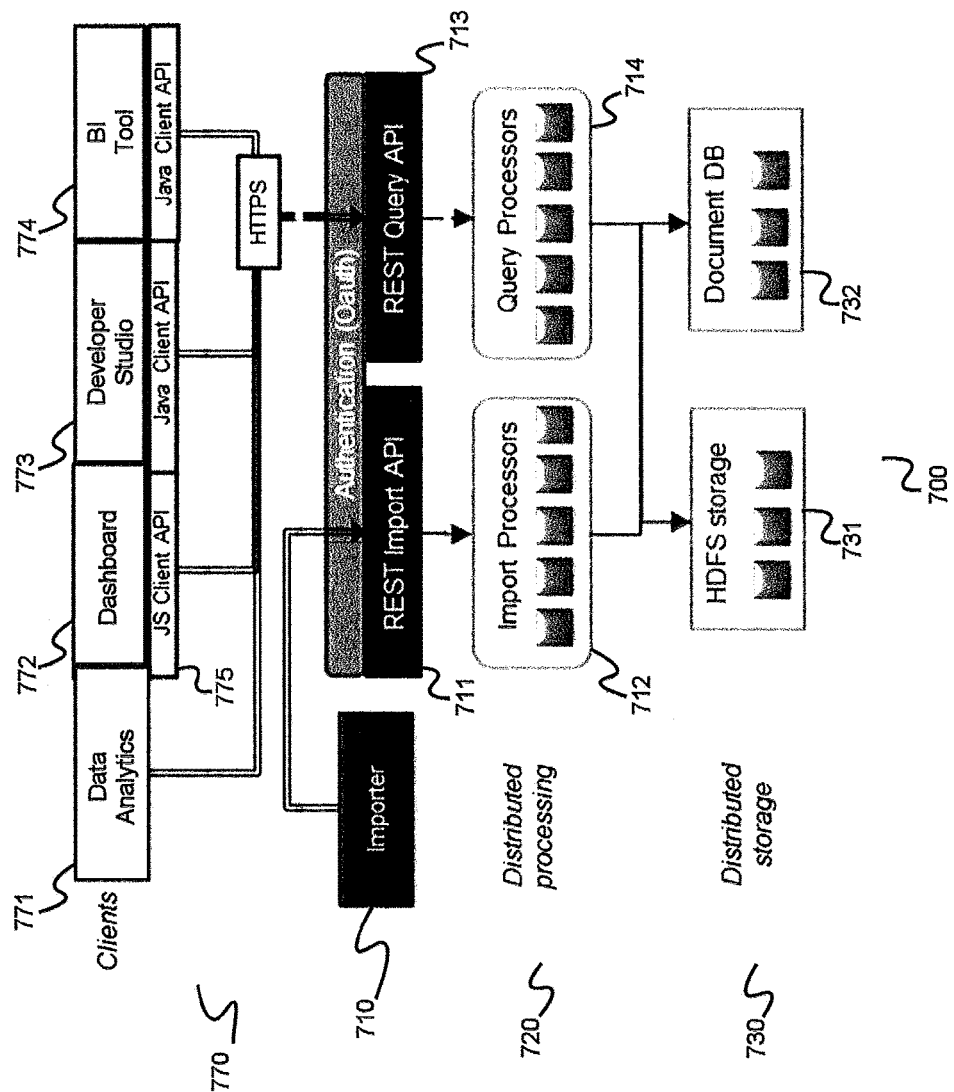
FIG. 7 is a block diagram illustrating a scalable NLI system architecture, according to an embodiment of the invention.

FIG. 7 is a block diagram illustrating a scalable NLI system architecture 700, according to an embodiment of the invention. According to the embodiment, a REST query API 713 may be utilized to receive NLI and query data from a plurality of input sources 710, and may generate and provide JSON data for use. JSON data may be provided to a plurality of query processors 714 for use in a distributed processing sub-system 720, to analyze the information efficiently and in a scalable fashion; that is, through the use of distributed processing it becomes simple to expand system 700 to accommodate new features or components. Further according to the embodiment, a REST import API 711 may be utilized to receive imported data from a log file importer 710, that may import log files and various logged data for use. Import API 711 may provide imported data to a plurality of distributed import processors 712 for processing. After processing, import processors 712 and query processors 714 may store processed data output in a plurality of distributed storage media 730, such as a plurality of HDFS storage 731 or document databases 732, for future reference.

Import API 711 Query API 713 may be utilized in a variety of ways according to a particular arrangement, such as to receive queries form a user or from scripts that may generate queries automatically or semi-automatically, or to interact with external software applications such as NLI software programs or visualization components such as interfaces or dashboards for presenting data or receiving input. APIs 711, 713 may also be directly integrated with specific applications for use, such as via JAVA™ or similar software to integrate functionality within other software applications or for direct integration with hardware devices such as integrated controllers that may produce data for processing according to the invention.

According to the embodiment, data sources 770 may comprise a plurality of client applications or services that may produce or provide NLI data or log file data for use in processing as described above, and may optionally utilize software APIs 775 according to their particular use or arrangement. A data analytics software application 771 may process data and produce log files based on operation, that may then be queried by a query API 713 for use. A software dashboard 772 or developer studio 773 may produce NLI data and log user input based on received interaction. User input may have many parameters, such as (for example) Time, GPS, sentiment, dialog location, or any other such information pertaining to a particular user interaction or input. During rule-based matching, It may be appreciated that portions of logged data may be utilized as needed, while other data may be "set aside" or temporarily discarded during a particular operation, but retained for future use. NLI Analytics may be used to do "deeper clustering" of the same data, which could lead to new insights—data may not necessarily be used to improve the solution, but additional uses may be to help marketing, product recommendations.

According to the embodiment, cluster computing such as the APACHE SPARK™ framework (for example) may be utilized to perform long-running or continuous operations that may process large amounts of data. In this manner it may become possible to perform large-scale queries against data in storage as well as data readily available to an analytics platform, as well as more graceful large-scale and long-term features such as batch scheduling or pause/resume for operations that may enable an operation to resume from where it was interrupted. Additionally, the use of "supervised" and "unsupervised" clustering simultaneously or interchangeably, may provide new functions by combining the advantages of a rules-based analysis approach and machine learning through the use of adaptive behavior performed in clustered operation. In this manner, it can be appreciated that according to the embodiment operation may be performed in a "hybrid" arrangement, combining rule-based and machine learning operations to take advantage of their respective strengths and form a more robust and versatile overall system. This enables flexible approaches to NLI applications not found in current implementations. For example, a user cannot "teach new tricks" to a VA application such as SIRI™ or CORTANA™, they simply operate under predefined rules and do not change without explicit modification from the VA operator—very little user customization is possible, generally only to the extent of specifying trivia that are stored and substituted as simple data values when constructing responses ("Siri, call me 'Jim'", prompting the VA application to substitute "Jim" whenever the user's name is requested).

Utilizing machine learning according to the invention makes the process of user customization more fluid and natural, and removes the need for large amounts of manual configuration as the NLI application may continually learn and adapt through normal operations rather than simply storing a series of data values based on user input for later substitution. Additionally, when utilizing rules-based operation and machine learning in a hybrid manner according to the embodiment, operation rules themselves may be modified and adapted during machine learning behavior. For example, when a new rule is generated or manually configured by an administrative user, the system may compare the new rule and potential operational results of using it (such as what dialog tree it may route interactions to, or potential pitfalls where operation may break or invoke a safety net), and may consider whether a "better" rule or variation already exists or is easily recognized. In the case of manually-configured rules, a user may be notified of any alternatives or suggestions, for example prompting the user to decide which version of the rule they wish to commit to operation or offering a comparison based on hypothetical operation ("If a user inputs X, Y happens. Using this version, Z happens"). A variety of testing may also be performed during operation or against a collection of stored rules or data (such as an offline "audit" of system operation), for example using A/B testing to compare the two possible variations of a processing rule according to the previous example.

A further use of such a hybrid operational approach may be a variety of high-level insights and analysis results, such as user profiling (such as by analyzing a collection of user data such as profile information or contact information). It can be appreciated that operation benefits from a data-rich environment, as any and all data may be analyzed and learned from in the continuous improvement of NLI operation according to the invention. For example, user behavior may be analyzed and a system may learn from or adapt to a user's reactions to certain responses, specific language used by a user, a user's location or device information, profile information such as age or gender, or any other such information that may be identified and associated with a user. Furthermore, derived data such as user sentiment may be identified and used, such as by analyzing user behavior and identifying changes in mood or attitude based on NLI interaction, to determine a user's emotional preference or behavior trends and use those to tailor operation to accommodate the user's specific preference or behavior. It can be appreciated that, again, this enables a more natural interaction experience for a user, as learning occurs naturally through observation and analysis during regular interactions and does not "break the fourth wall" by requiring a user to explicitly "teach" a system or manually input data.

Another example of high-level learning may be that of market analysis, such as analyzing user behavior across a large user base rather than on a specific per-user level. For example, it may be impossible for users to add an item to their shopping cart on an online storefront, but it may be recognized that a number of users are viewing or requesting a certain product (or class of products, such as "fishing equipment" or "items within 20 miles"). Additionally, competitor products or online presence may be analyzed, enabling such learning as "customers want this specific fishing gear that we don't offer, but competitor X does". This may then be used in providing recommendation or automatic changes, such as "if we add this product we can retain more customers and increase sales over competitor X", or "these similar products are in our inventory, we should pitch them to customers as an alternative". Such analysis may then be segmented based on user location, age groups, gender, education, social presence, or any other such per-user analysis or learning as described above, increasing relevancy for each individual user while also increasing granularity and usefulness of information on large scale for an NLI operator.

Figure 8:
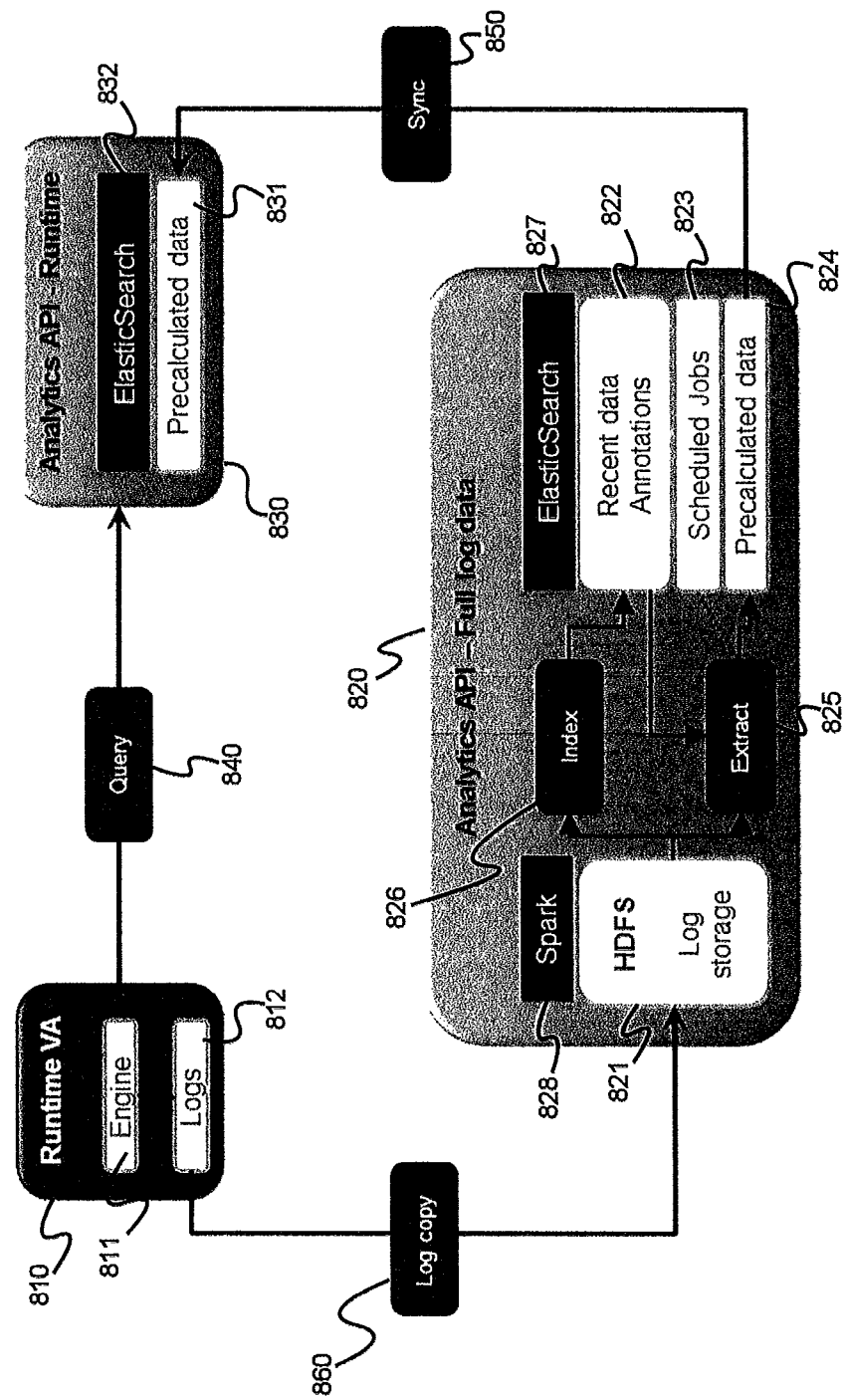
FIG. 8 is a block diagram illustrating an exemplary system and process for an NLI analytics API runtime operation, according to an embodiment of the invention.

FIG. 8 is a block diagram illustrating an exemplary system and process for an NLI analytics API runtime operation, according to an embodiment of the invention. According to the embodiment, a virtual assistant (VA) application 810 may operate a software processing engine 811 that performs the functions and roles of the VA application, and may generate a plurality of log files 812 during or based on operation. Copies of log files 860 may be stored for future reference, such as in an HDFS log storage database 821, and additional copies of log files may be requested 840 by a query API as described previously (referring to FIG. 7). Queried log file data 840 may be provided to a runtime analytics API 830, that may operate a search engine such as ELASTICSEARCH™ 832 to process log data during operation, and stored log file data may be utilized by an analytics API 820 that may operate a search engine such as ELASTICSEARCH 827 to query log file data, and a plurality of distributed processing components such as APACHE SPARK 828 for use in processing log file data. Data provided by a storage 821 may be indexed 826 to facilitate efficient search and query operations, and any available data annotations 822 may be identified and extracted 825. After extraction, any scheduled or triggered operations 823 may proceed, and a plurality of precalculated data 824 such as predicated values or known data from previous operation may be synchronized 850 with a plurality of other precalculated data 831 from a runtime analytics API 830.

According to a preferred embodiment, data-driven VA development may be provided through the use of an integrated development environment (IDE) for VA applications. Log information from a running VA 810 may be stored in a database 821, which may then provide log information to an NLI analytics engine 830. Analytics output may then be provided to an IDE 860, where a user may view log data and analysis results as well as provide new VA configuration or programming instructions, effecting an NLI optimization operation. Output from an IDE 860 may then be provided directly to a running VA 810 for incorporation and use, without requiring "downtime" where a VA may be taken offline during development (as is common in traditional development operations). In this manner, NLI analytics and optimization may occur during run-time operations, without impacting customer interactions with a VA.

According to another embodiment, queries may be processed in an incremental fashion, wherein a portion of a query may be processed individually (and thus producing log file information relevant to that specific query portion). Such an approach may be used to allow for iterative analysis wherein portions of queries may be analyzed separately from the rest of an original query, facilitating more efficient analysis of key information such as specific language operators (such as words or phrases) or specific query parameters (such as requests for information or requests for action). Operation may be configurable, such as by specifying the length or arrangement of query portions to be divided for analysis, and such configuration may then in turn be automated in combination with reporting and machine learning, as described below. In an automated arrangement, for example, analysis might reveal that a specific phrase is of particular importance, driving a configuration change to isolate that phrase for incremental analysis in future operations.

Figure 9:
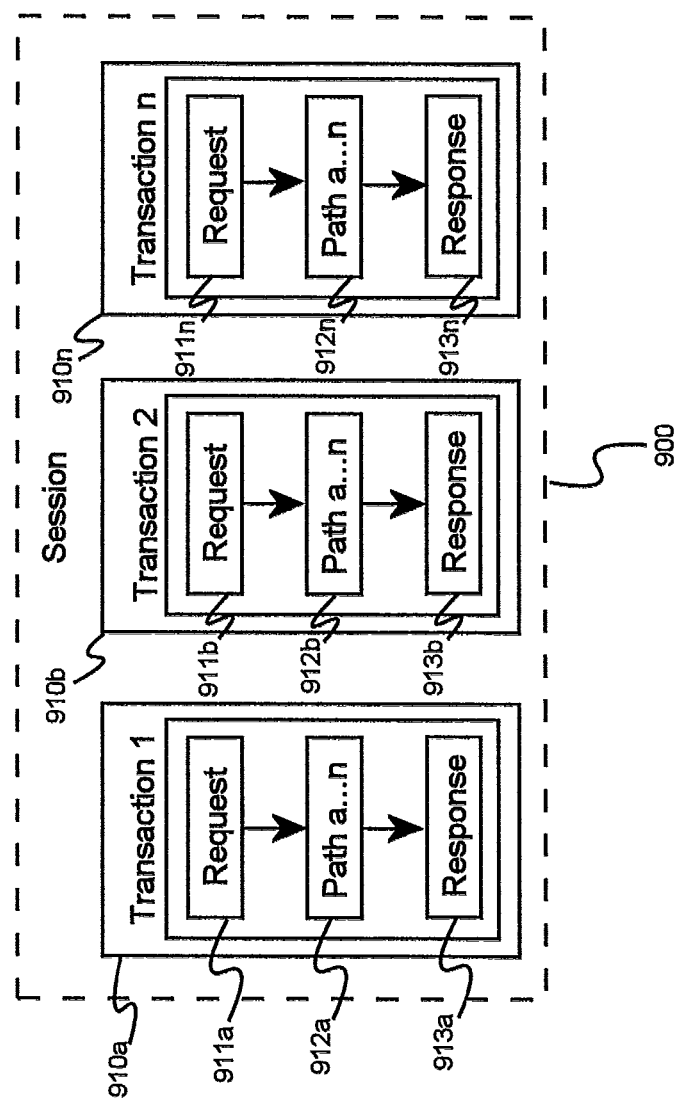
FIG. 9 is a block diagram illustration the relationship between data types in an NLI dialog, according to an embodiment of the invention.

FIG. 9 is a block diagram illustration the relationship between data types in an NLI dialog 900, according to an embodiment of the invention. According to the embodiment, a dialog may be represented as a single "session" 900, comprising a plurality of discrete "transactions" 910*a-n* in a sequence—that is, transaction 1 910*a* happened, then transaction 2 910*b*, continuing until a final transaction n 910*n*. Each transaction may be represented as a single operational processing sequence beginning with a request 911*a-n* that may be a user input or request (such as a user attempting to perform an action or request an action from a VA application, for example). Request 911*a-n* is then processed in a path 912*a-n* sequence comprising a plurality of system operations, such as "flow X is triggered", "listener Y is executed", "output node Z is visited", and similar internal system operations that may be performed during the processing of a user request. When processing is completed, a response 913*a-n* may be sent, comprising a processing output from previous path steps or a confirmation of a user request signaling the conclusion of processing.

According to the embodiment, each data type or level may have a plurality of unique or inherited properties, as well as a plurality of data augmenters associated with it, and these properties may be queried or operated on via an NLI analytics platform or using an NLIQL, according to the invention.

According to another embodiment, a plurality of reporting tools may be provided, such as via a web interface or a network-connected software application that may receive output from system operation. Reporting may comprise a variety of raw or annotated log data, analysis results from an NLI analytics operation, tabulated data on NLI run-time operations such as VA statistics, or interactive reporting interfaces such as a "dashboard" where a user may view and interact with report data (for example, to annotate reporting data for future reference, or to provide instruction based on report contents). In this manner operation may be monitored in real-time (during run-time operation) or at a later time, by enabling the production and storage of reporting data. It should be appreciated that reports may be highly configurable, such as to tailor reporting data to efficiently display specific information that may be desirable for a particular arrangement or operation. For example, a report may be configured to specifically monitor user behavior such as interactions with a VA application. Such an arrangement may be used to report what users are requesting or what actions they are performing, what their reactions are to VA actions, what their sentiment or engagement are with a VA or a VA provider (for example, to gauge a user's opinion of a company operating a VA), or any other such user statistics that may be observed or inferred through NLI analytics operations. Additionally, such user behavior may be monitored over time, for example to determine how user sentiment is affected by VA interactions, or to observe behavior trends such as "customers are submitting an increased number of food-related queries this week".

The nature of a reporting operation or reports produced or presented may vary according to a particular arrangement or use case. For example, numerical or statistical reports may be appropriate for monitoring a VA system, for example to track performance or operational metrics. Such reports may generally be highly metric-oriented, generally suited for monitoring and quantifying machine operation in terms of numerical statistics such as dialog or error counts, specific error types, measurements of how long operations take or how large input or output information is, or other such statistical information. According to another use case, reporting may place more focus on semantics such as "what users are saying", as may be suitable for monitoring and reporting on user behavior or trends as described above. For example, NLI matching rules (as described previously) may be used to process user queries, VA responses, or NLI data contained in log file information such as stored user input from previous operations. It can therefore be appreciated that NLI analytics may be suited for different reporting uses according to its occurrence within an NLI process—during editing in a data-driven development environment, during run-time for use in real-time reporting on system performance or other statistical reporting, or during an analysis operation to report on user behavior or trends. In this manner it can be appreciated that the use of configurable reporting enables relevant information to be easily exposed according to the particular nature of an arrangement or the intended use case of a specific NLI environment or VA application. Additionally, the use of reporting may benefit from additional "reporting-focused" NLI rules, such as sentiment matching rules that may be suitable for driving analytics operations and reporting, but may be unsuitable for driving user interactions.

The use of reporting as described previously may then facilitate various automated or machine learning behaviors, generally through a continuous operation comprising both analysis and taking action based on the results of analysis (as may be provided by reporting). For example, analysis might reveal specific patterns of data or operation, and then include a prompt in a report presented to a user for review, wherein the user may be provided with options for action based on the observed patterns. In this manner, a form of "meta-analysis" may be used, wherein analysis results may then in turn be analyzed for patterns, trends, or anomalies. These meta-analysis results may then be used to form predictions, comparisons against historical data, and suggestions for action to improve operation. According to various particular arrangements, suggestions may be presented to a user for review and selection or approval, or they may be automatically implemented to facilitate an adaptive machine learning system. According to an adaptive arrangement, various forms of testing may be utilized to determine how to optimize operation, such as to deploy a suggested change and monitor the results, or to use A/B testing to compare and identify areas for improvement.

Several exemplary uses for NLI analytics according to the embodiments disclosed herein, may be considered as exemplary search queries that would be poorly handled using current solutions but that may be properly addressed according to the embodiment. For example, searching for a list of countries where consumers have purchased a product "X", sorted by frequency of purchase within each country. These forms of abstract queries are difficult to address through simple NLI handling and will benefit greatly from the closed-loop and adaptive approaches of the invention. Further examples may include querying for a list of the most commonly-purchased products in a region, how many dialogs are interacted with in a given timeframe or on a specific day, identifying a change in user behavior or opinion after a purchase, finding all dialogs wherein a user input a specific value or specific types of information, list of specific failed dialogs or all dialogs that resulted in a specific action or task being performed, or identifying trends in words, dialogs, flows, or other activities.

Some additional exemplary use cases for NLI querying and analysis are briefly described below:

show me all inputs/sessions natural language matching PC and CLEAN show me top10 concepts of all inputs natural language matching PC CLEAN . . .

Queries combining "what I do know" AND "what isn't there" . . .

Show me all dialogues where alienware (engine matching) was mentioned and (a purchase intent existed OR buy phrase (engine matching) was mentioned) and they didn't buy Show me all dialogues where they showed purchasing and didn't show a negative sentiment . . .

Show me all dialogue's where people asked about red jumper and didn't ask about the blue jeans . . .
Making a query over past period:
Example Retail Bank: "What complaints were posted on Twitter about our branch on Post Street, San Francisco during past 6 months?"
Making a query over past period:
Example Telco: "Show me all dialogues across all channels from past 6 months about Apple phones whereby the prospect had a purchase intent but did not make the purchase. Show me the key concepts/themes in these dialogues and if any of the themes are trending up/down . . .
Note: about "Apple phones" means that it is engine-Matching (showcasing natural language understanding in the analytics and not just simple stringmatching . . . instead matching using full power of NLIQL etc. . . . )
Show me all dialogues where
It was about "red dresses"
Purchase intent was detected
Initially was "happy sentiment" and later "negative sentiment was detected"
Dialogue ended without purchase taking place . . .
Then based on above found dialogues . . .
Show me other co-related key-concepts these users where looking for . . .
Show me concepts which is trending up/down
user wants to find all dialogues where a purchase intent was shown, where it was about iOS devices of some kind, where it was a negative sentiment towards end of dialogue and where no purchase happened
    user: open studio . . . goes to "data analysis wizard" . . . .
    user: selects "show me dialogues"
    user: selects a premade rule/object "purchase intent" . . .
    user: selects a premade rule/object "negative sentiment" and adds "towards end"
    user: selects "natural language matching" and by simply typing in a couple of example questions with different ways of expressing "ios devices" creates a powerful natural-language matching rule . . .
        system under the hood takes the example questions and via the patented mechanisms and the powerful TLR's creates the natural-language matching rule "ios devices" . . .
    user selects "no purchase"
    user clicks run . . . and the rule is automatically run in analytics API against all data . . .
    user spends a bit of time looking at result and finds hmm . . . I would want to see it in a concept cluster view . . . .
    User sees hmm . . . that's interesting . . . ios7+negative is big . . .
    User thinks hmm wonder how it looks over time and selects "show me the concepts over time/trend-view . . . "
    . . .
    User have found a set of direct actionable insights . . . user informs marketing and productMgt . . . and they quickly address the points . . .
    User additionally thinks . . . woow this was highly useful data we should look at this regularly and not just in isolation but even better to look at this in my main BI/BigData system to allow direct cross-referencing with other data . . . .
    User presses "publish queries"
        The queries now become accessible via the API and accessible and usable within SAP . . . so SAP user can now directly and easily pull in the data . . . .
        Sidenote: in SAP there should also be a "analytics API rule wizard" as part of the integration NLI analytics may be utilized according to the invention in a "closed loop" manner, providing a single tool to address multiple functions such as creating, analyzing and updating NLI data. Such an approach becomes possible through the use of an analytics platform according to the embodiments described above, enabling both analysis and optimization within a singular operation process. Interactions may be logged and stored for automatic import and use in NLI analytics, thereby "closing the loop" by providing a seamless operation loop from receiving NLI data to analyzing, optimizing, and storing new data before repeating operation.

The skilled person will be aware of a range of possible modifications of the various embodiments described above. Accordingly, the present invention is defined by the claims and their equivalents.

What is claimed is:

1. A system for natural language analytics, comprising:
    a natural language application data importer comprising at least a processor, a memory, and a plurality of programming instructions stored in the memory and operating on the processor, wherein the programming instructions, when operating on the processor, cause the processor to import natural language application data from external natural language interaction sources via a network;
    a natural language application analysis manager comprising at least a processor, a memory, and a plurality of programming instructions stored in the memory and operating on the processor, wherein the programming instructions, when operating on the processor, cause the processor to:
        perform data analysis on the natural language application data using a natural language interaction query language (NLIQL) wherein the data analysis comprises storing natural language application data as sequences of events;
        cross-reference the analyzed data against additional data from external sources;
        model a first natural language session as an ordered sequence of natural language events;
        query the data stored in the system by using NLIQL;
        produce a second natural language session based on the first natural language session and the results of the analysis and query operations;
        provide the second natural language session to an external natural language interaction source for use;
    wherein NLIQL is a query language that provides functionality for:
        analyzing natural language interaction;
        modeling natural language interaction elements as events in a flat file structure, wherein each event belongs to one of three event types, the event types comprising inputs sent to a natural language interaction system, responses sent from a natural language interaction system, and path events comprising actions occurring after an input and prior to a response;
        modeling natural language interaction sessions as ordered sequences of events;
        defining constraints within the unstructured, natural language elements of the data stored in the system;

defining constraints within the structured, natural language independent elements of the data stored in the system; and combining these both kinds of constraints in one and same query.

2. The system of claim 1, further comprising a natural language application data storage component comprising at least a processor, a memory, and a plurality of programming instructions stored in the memory and operating on the processor, wherein the programming instructions, when operating on the processor, cause the processor to store natural language application data.

3. The system of claim 2, wherein the stored data further comprises natural language data and natural language independent log data.

4. The system of claim 2, wherein the stored data further comprises augmentations of natural language application data.

5. The system of claim 2, wherein the stored data further comprises results of natural language application data analysis.

6. A system for natural language analytics, comprising:

a log importer comprising at least a processor, a memory, and a plurality of programming instructions stored in the memory and operating on the processor, wherein the programming instructions, when operating on the processor, cause the processor to receive logged information from external natural language interaction sources via a network;

an analytics API comprising at least a processor, a memory, and a plurality of programming instructions stored in the memory and operating on the processor, wherein the programming instructions, when operating on the processor, cause the processor to analyze the received log information, store the analyzed information in a flat format as events and ordered sequences of events, produce new ordered sequences of events based on received log information, and provide a new ordered sequence of events to an external natural language interaction source for use as an improved natural language session; and an analytics management server comprising at least a processor, a memory, and a plurality of programming instructions stored in the memory and operating on the processor, wherein the programming instructions, when operating on the processor, cause the processor to facilitate user interaction with the system via at least an interface operating on the processor of the analytics management server.

7. The system of claim 6, wherein the external natural language interaction sources are software applications.

8. The system of claim 6, further comprising a database stored and operating on a network-connected computing device.

9. The system of claim 8, wherein the database stores and provides information useful for operation of the system.

10. The system of claim 9, wherein the stored information comprises received log information.

11. The system of claim 10, wherein the stored information comprises analysis results.

\* \* \* \* \*